(12) United States Patent
Fioravanti et al.

(10) Patent No.: US 9,598,188 B2
(45) Date of Patent: Mar. 21, 2017

(54) VERTICAL PACKAGING MACHINE FOR FOOD PRODUCTS

(75) Inventors: Andrea Fioravanti, Torrebelvicino (IT); Giovanni Boschetti, Torrebelvicino (IT)

(73) Assignee: P.F.M. SPA, Torrevelvicino (IT)

( * ) Notice: Subject to any disclaimer, the term of this patent is extended or adjusted under 35 U.S.C. 154(b) by 619 days.

(21) Appl. No.: 14/116,040

(22) PCT Filed: May 2, 2012

(86) PCT No.: PCT/IB2012/052196
§ 371 (c)(1),
(2), (4) Date: Nov. 6, 2013

(87) PCT Pub. No.: WO2012/153235
PCT Pub. Date: Nov. 15, 2012

(65) Prior Publication Data
US 2014/0090337 A1    Apr. 3, 2014

(30) Foreign Application Priority Data
May 11, 2011   (IT) .............................. VR2011A0098

(51) Int. Cl.
*B65B 7/02*   (2006.01)
*B65B 9/207*   (2012.01)
(Continued)

(52) U.S. Cl.
CPC ................ *B65B 7/02* (2013.01); *B29C 65/18* (2013.01); *B29C 65/74* (2013.01);
(Continued)

(58) Field of Classification Search
CPC .. B65B 7/02; B65B 9/20; B65B 9/207; B65B 51/303; B29C 65/18; B29C 65/74;
(Continued)

(56) References Cited

U.S. PATENT DOCUMENTS 3,685,250 A * 8/1972 Henry ................. B29C 66/1122
53/374.6
3,925,963 A * 12/1975 Greenawalt ........... B65B 9/2042
156/497
(Continued)

FOREIGN PATENT DOCUMENTS

EP    0276628 A1    8/1988
EP    0518237 A2    12/1992
(Continued)

OTHER PUBLICATIONS

International Search Authority, Search Report for International Application PCT/IB2012/052196, Sep. 26, 2012 (EPO), 1 page, The Hague, Netherlands.

*Primary Examiner* — Hemant M Desai
*Assistant Examiner* — Eduardo R Ferrero
(74) *Attorney, Agent, or Firm* — Ference & Associates LLC

(57) ABSTRACT

A packaging machine comprising a transversal sealing unit (20) of bags, substantially consisting of a plate support (21) which comprises a series of additional supports and kinematic organs for the horizontal and vertical activation of grippers (22, 23), one internal and the other external, for the sealing and cutting of each bag, said machine comprising motors (25, 26), mounted on a fixed support (24), which cause the vertical movement of a main carriage (29) and of a gripper carriage (30) by means respectively of a screw shaft (27) and a screw shaft (28), said main carriage (29) supporting two pairs of horizontal and sliding parallel arms (33, 34), the internal first of which control the horizontal movement of the internal grippers (22) and the second control the horizontal movement of the external grippers (23), while the vertical movement of the grippers to follow (Continued)

the moving bag is achieved by the vertical movement of the main carriage (29).

8 Claims, 5 Drawing Sheets

(51) Int. Cl.
  *B65B 51/30* (2006.01)
  *B29C 65/18* (2006.01)
  *B29C 65/74* (2006.01)
  *B29C 65/00* (2006.01)

(52) U.S. Cl.
  CPC ...... *B29C 66/1122* (2013.01); *B29C 66/4312* (2013.01); *B29C 66/8223* (2013.01); *B29C 66/8225* (2013.01); *B29C 66/83543* (2013.01); *B29C 66/849* (2013.01); *B65B 9/207* (2013.01); *B65B 51/303* (2013.01); *B29C 66/71* (2013.01); *B29C 66/8246* (2013.01); *B29C 66/834* (2013.01); *B29C 66/83541* (2013.01)

(58) Field of Classification Search
  CPC ............. B29C 66/1122; B29C 66/4312; B29C 66/8223; B29C 66/8225; B29C 66/8246; B29C 66/834; B29C 66/83513; B29C 66/83541; B29C 66/83543
  USPC ......... 53/374.3, 374.5, 374.6, 550, 551, 552
  See application file for complete search history.

(56) References Cited

U.S. PATENT DOCUMENTS

| | | | | |
|---|---|---|---|---|
| 3,986,921 A | * | 10/1976 | Putnam, Jr. | B29C 65/18 100/264 |
| 4,129,976 A | * | 12/1978 | Grundler | B29C 66/8491 493/236 |
| 4,391,081 A | * | 7/1983 | Kovacs | B29C 66/8225 53/436 |
| 4,537,012 A | * | 8/1985 | Groom | B29C 65/18 53/374.8 |
| 4,727,707 A | * | 3/1988 | Hadden | B65B 9/2028 53/451 |
| 4,729,210 A | * | 3/1988 | Galliano | B29C 65/18 53/441 |
| 4,751,808 A | * | 6/1988 | Hadden | B29C 65/743 53/373.4 |
| 4,757,668 A | * | 7/1988 | Klinkel | B29C 65/02 53/374.6 |
| 4,790,124 A | * | 12/1988 | Kaji | B65B 51/30 53/552 |
| 4,996,825 A | * | 3/1991 | Bacon | B29C 66/1122 53/374.8 |
| 5,062,253 A | * | 11/1991 | Bacon | B65B 51/30 53/374.8 |
| 5,117,612 A | * | 6/1992 | Keim | B29C 65/18 53/374.8 |
| 5,377,474 A | * | 1/1995 | Kovacs | B65B 9/2028 53/451 |
| 5,540,035 A | * | 7/1996 | Plahm | B65B 9/20 53/450 |
| 5,904,027 A | * | 5/1999 | Bonde | A23G 7/00 53/374.3 |
| 6,212,861 B1 | * | 4/2001 | Tsuruta | B29C 65/18 53/374.6 |
| 6,526,732 B2 | * | 3/2003 | Liao | B29C 65/18 53/371.6 |
| 6,729,113 B2 | * | 5/2004 | Miyamoto | B65B 51/306 53/374.5 |
| 6,877,295 B1 | * | 4/2005 | Benedetti | B29C 65/3656 53/374.6 |
| 6,895,725 B2 | * | 5/2005 | Cortigiano, Sr. | B29C 66/4322 493/213 |
| 7,011,129 B2 | * | 3/2006 | Kammler | B29C 65/02 156/580 |
| 7,067,037 B2 | * | 6/2006 | Wright | B29C 65/18 156/359 |
| 7,448,188 B2 | * | 11/2008 | Hauers | B65B 9/2028 53/371.6 |
| 7,726,105 B2 | * | 6/2010 | Talacci | B29C 65/02 53/365 |
| 7,866,131 B2 | * | 1/2011 | Kammler | B65B 51/30 53/451 |
| 8,539,741 B2 | * | 9/2013 | Lubezny | B29C 65/02 53/451 |
| 2002/0020153 A1 | * | 2/2002 | Klinkel | B65B 9/207 53/551 |
| 2005/0051274 A1 | * | 3/2005 | Kammler | B29C 65/02 156/391 |
| 2005/0067109 A1 | * | 3/2005 | Kammler | B29C 65/02 156/538 |
| 2006/0064945 A1 | * | 3/2006 | Kammler | B29C 65/18 53/479 |
| 2007/0163214 A1 | * | 7/2007 | Hauers | B65B 9/2028 53/551 |
| 2009/0301661 A1 | * | 12/2009 | Kammler | B29C 65/745 156/538 |
| 2010/0043358 A1 | * | 2/2010 | Tsuruta | B29C 65/18 53/463 |
| 2010/0269452 A1 | * | 10/2010 | Veix | B29C 66/8246 53/370.7 |
| 2011/0192117 A1 | * | 8/2011 | Lubezny | B29C 65/02 53/456 |

FOREIGN PATENT DOCUMENTS

| | | |
|---|---|---|
| EP | 0764580 A1 | 3/1997 |
| EP | 1757523 A1 | 2/2007 |

\* cited by examiner

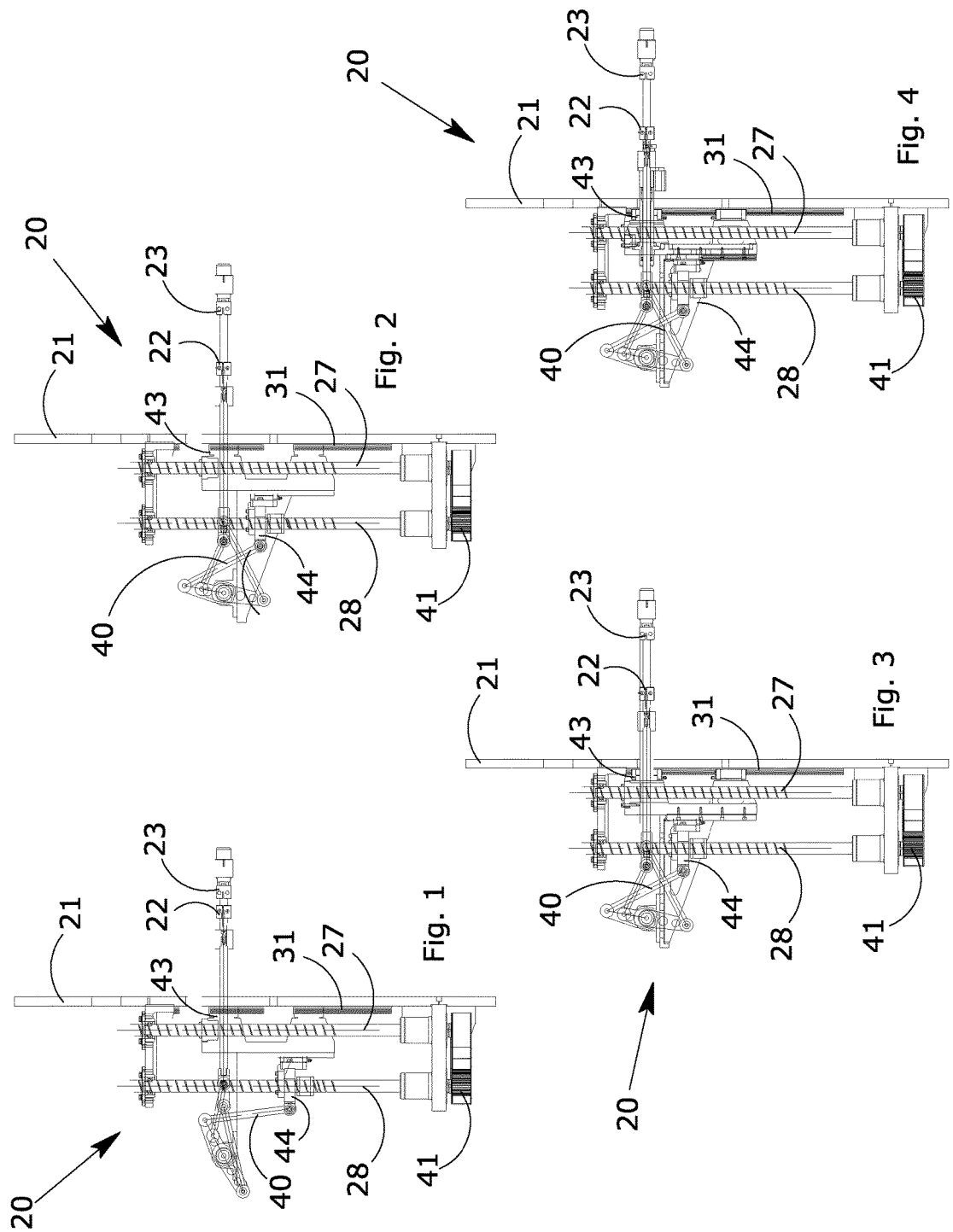

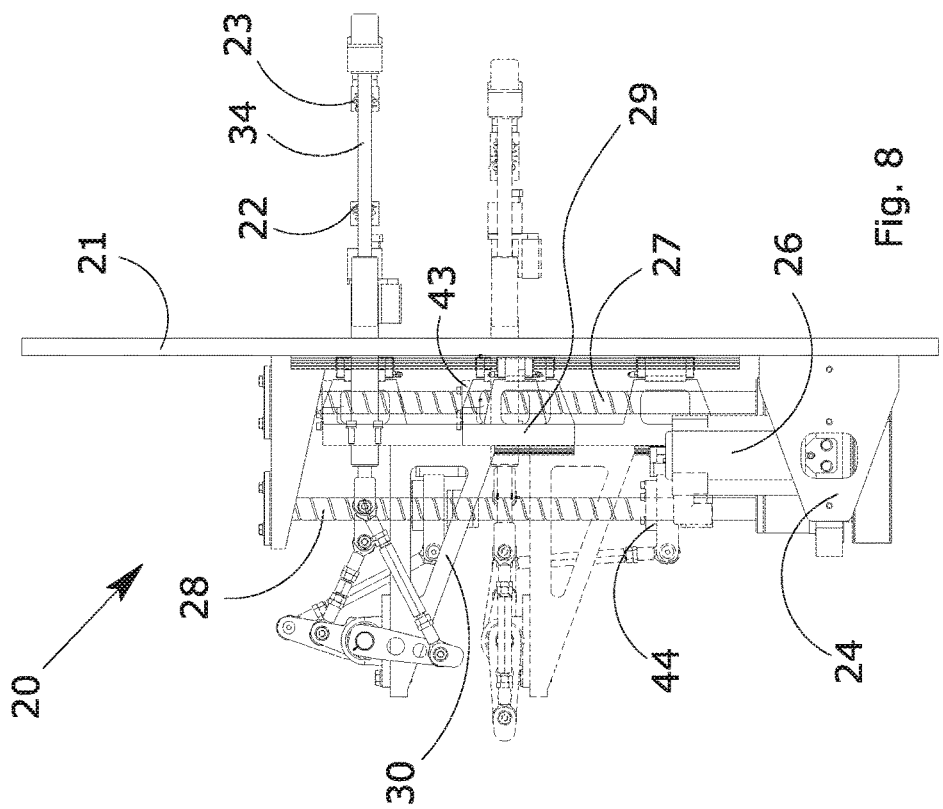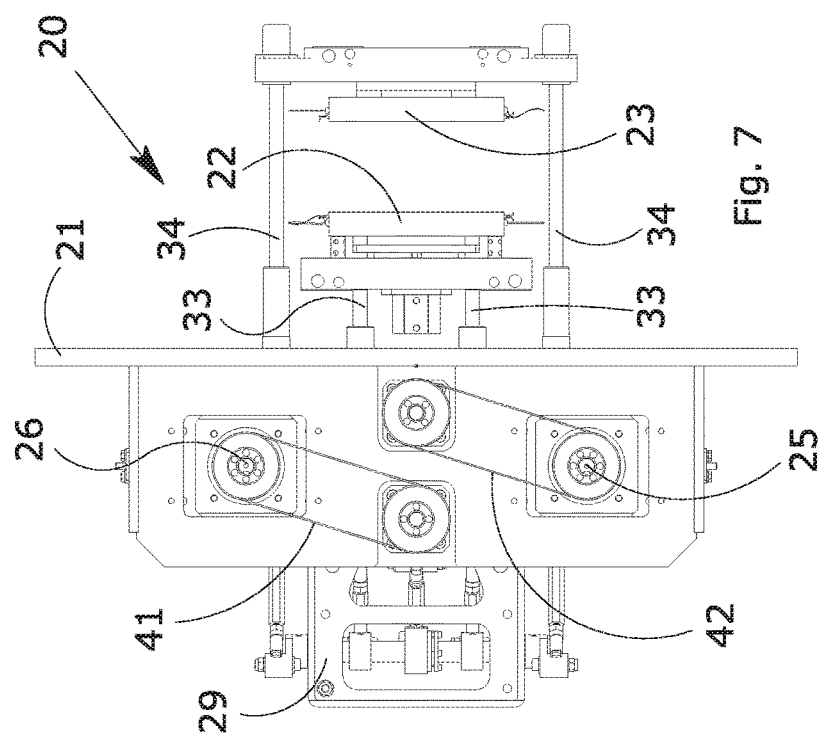

VERTICAL PACKAGING MACHINE FOR FOOD PRODUCTS

TECHNICAL FIELD

This invention refers to a vertical packaging machine for food products.

More specifically, this invention concerns a vertical packaging machine for food products defined as the "Box-Motion" type, that is to say with continuous processing, since the film is fed in an continuous operation and while the infeed speed may change it never stops during functioning.

The machine according to the invention comprises sealing grippers which must follow the bag during its movement; in particular, during sealing the closed grippers must move at the same speed as the bag.

The main movements of the grippers are controlled by two screws operated by two motors, which can guarantee that when the two screws rotate at the same speed the carriage moves vertically and the grippers remain at the same distance from each other: if they are open they remain open, if they are closed they remain closed.

This invention can be applied in the field of automatic dosing, weighing and packaging machines and equipment for food products, in particular in the sector of vertical packaging machines.

BACKGROUND ART

It is known that packaging machines for food products must have high levels of flexibility, performance, sturdiness and reliability so as to be versatile and able to produce a wide variety of different types of packaging.

The vertical packaging machines used in the food sector are mainly those employed in the fruit and vegetable, bakery and confectionery sectors, and make it possible to obtain cushion-type vertical packs, packs with a square base or with several seals.

The dimensions and formats of the bags can vary according to the features of the product to be packaged, the weight of each pack and the different pack formats required.

Packaging machines for food products, above all those with a forming tube, generally consist of a vertical infeed unit comprising a tubular element over which a plastic, PVC or similar material film is fed and through which the pre-dosed product to be packaged is progressively fed.

The plastic, PVC or similar material film is fed over the outside of the forming tube thanks to the use of infeed belts or rollers and is sealed by forming longitudinal and transverse closures thanks to heat-sealing units that can seal and cut the film to size so that the closure of the discharged bag consecutively forms the base of the next bag.

The head cut and seal are achieved with rotating grippers or with "long dwell" or "box motion" type systems.

The longitudinal seal uses drive belts and sealing units to keep the film taut, to seal it and to fold the longitudinal fin.

All the main drives have controlled axes and are connected together in the on-board cabinet thus ensuring maximum expandability of the control system when the machine is equipped with highly complex infeed systems or various devices.

In intermittent functioning machines, the bags are formed with the following operations:
unwinding of the film;
forming of the bag;
gripper closing;
sealing and cutting of the bag;

Only after the bag has been cut does the film start to unwind again.

The grippers have practically just one movement: Open-Close.

In "box motion" type functioning machines, the sealing unit functions continuously.

The grippers perform the following steps:
gripper opening;
following of the bag during the forming step;
gripper closing;
sealing;
cutting of the bag;
opening and rising.

Throughout these operations the film does not stop, but continues to unwind.

The problem encountered with flow-pack solutions with traditional box-motion closure mainly concerns the fact that their specific design concept means that the drive organs are positioned on the package sealing and cutting carriage, which increases the mass of the operating unit thus drastically limiting the movements of the unit and slowing down the operating steps.

This all has a negative impact on the production capacity of the plant and thus on the production costs, which increase in proportion to the slowing down of the production stages.

DESCRIPTION OF THE INVENTION

The present invention provides a vertical packaging machine for food products which makes it possible to eliminate or at least reduce the drawbacks described above.

The invention also proposes to provide a vertical packaging machine for food products which is simple to produce and which at the same time makes it possible to solve the problems of overburdening and consequent slowness of the production stages.

This is achieved by means of a a vertical packaging machine for food products whose characteristics are described in the main claim.

The dependent claims of the solution in question describe advantageous embodiments of the invention.

The main advantages of this solution, in addition to those deriving from its construction simplicity, concern first of all the fact that during the forming with a "Box-Motion" type machine, which is defined as continuous functioning, there may be changes in speed but the machine never stops; the grippers must follow the bag during its movement and, in particular, the grippers must move at the same speed as the bag.

According to the invention, the main movements of the sealing grippers are driven by two screws controlled by two independent motors positioned on the base of the machine and not on the carriage as in known solutions.

If the two screws rotate at the same speed the carriage moves vertically and the grippers remain as they are, at the same distance from each other: if they are open they remain open, if they are closed they remain closed.

DESCRIPTION OF THE DRAWINGS

Other features and advantages of the invention will become clear on reading the description given below of one embodiment, provided as a non-binding example, with the help of the accompanying drawings, in which:

FIGS. 1 to 4 represent schematic views of the overall machine according to the invention in the various operating steps

FIG. 7 represents a front view of the machine from below and

FIG. 8 shows a side schematic view;

DESCRIPTION OF ONE EMBODIMENT OF THE INVENTION

Figure 6:
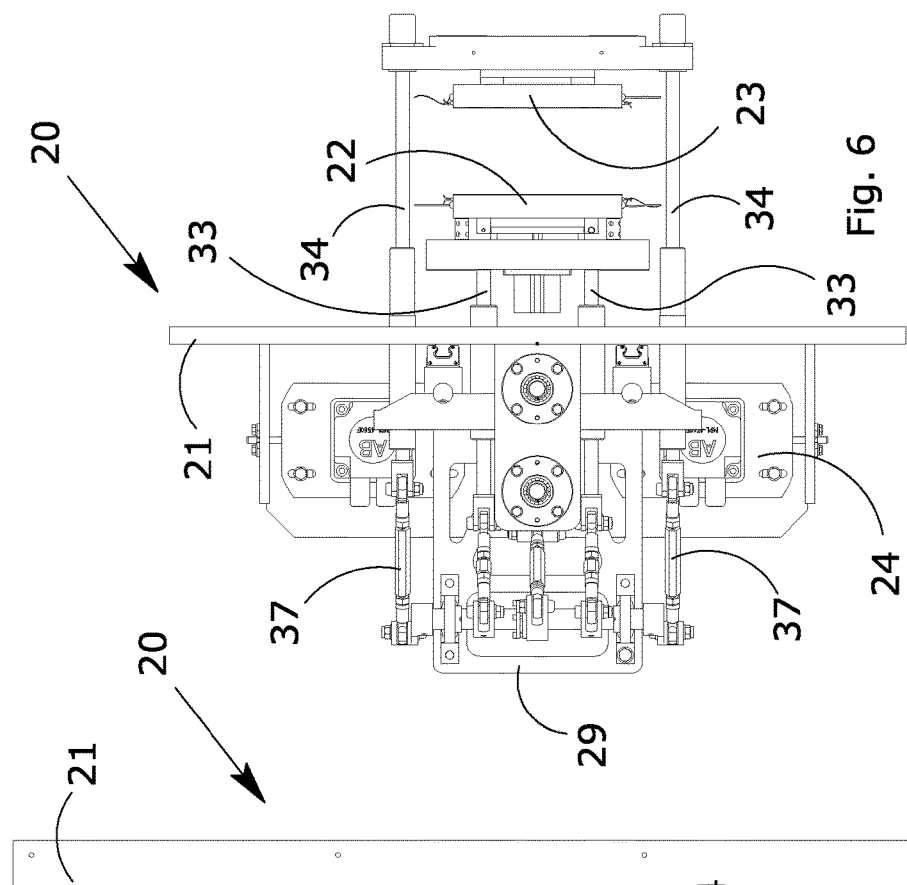
FIG. 5 shows a front schematic view and FIG. 6 shows a plan schematic view.
Figure 5:
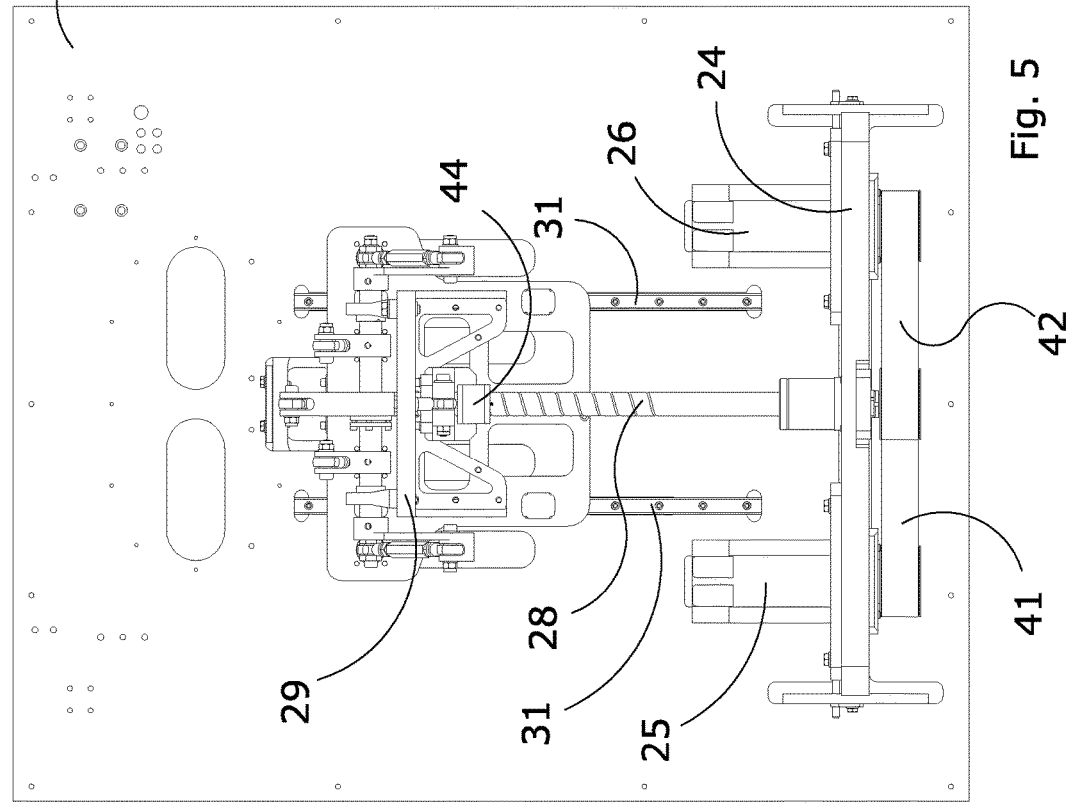
Figure 9:
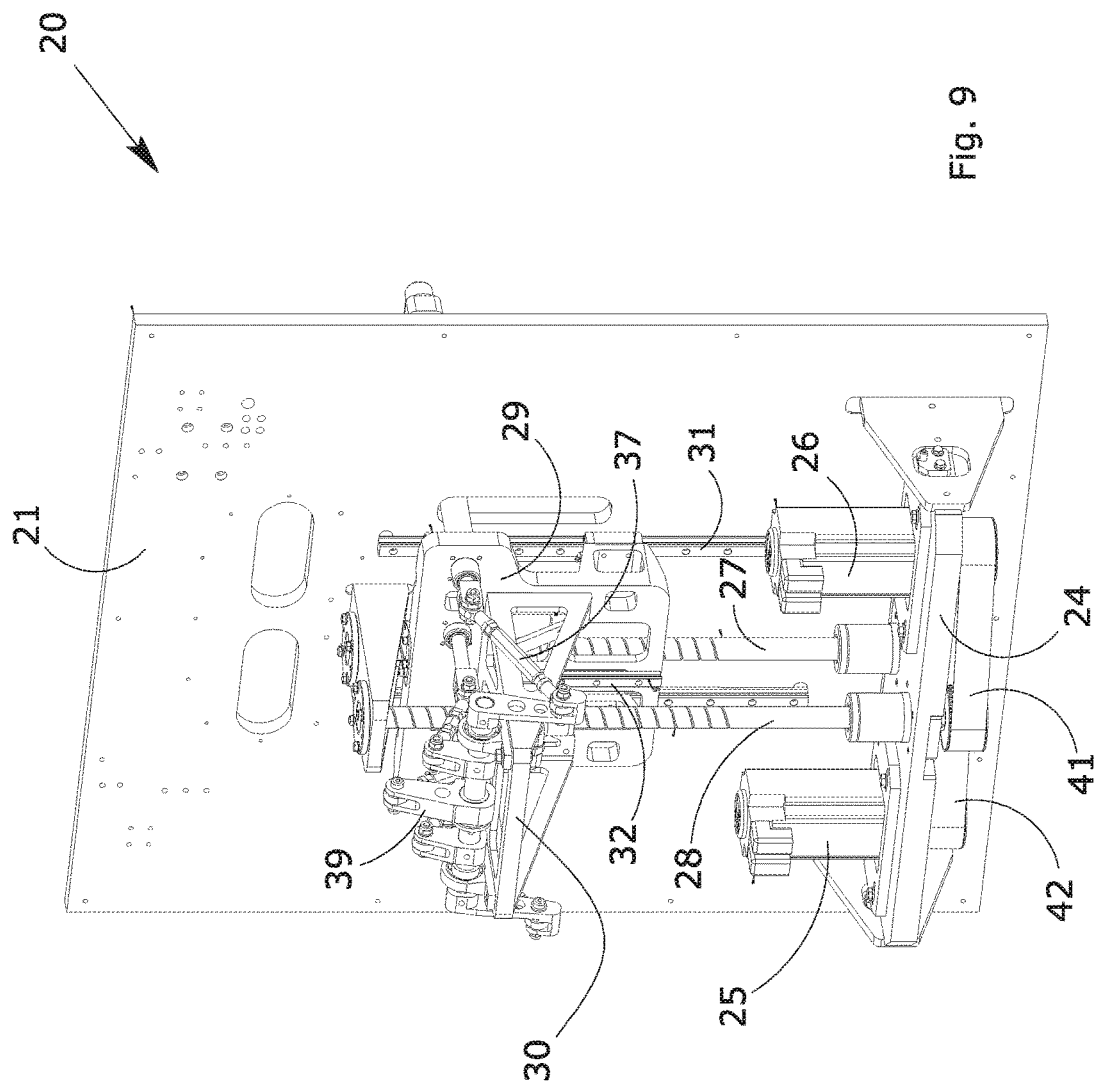
FIGS. 9 and 10 show schematic and prospective views of the machine taken respectively from the right side and from the left side.
Figure 10:
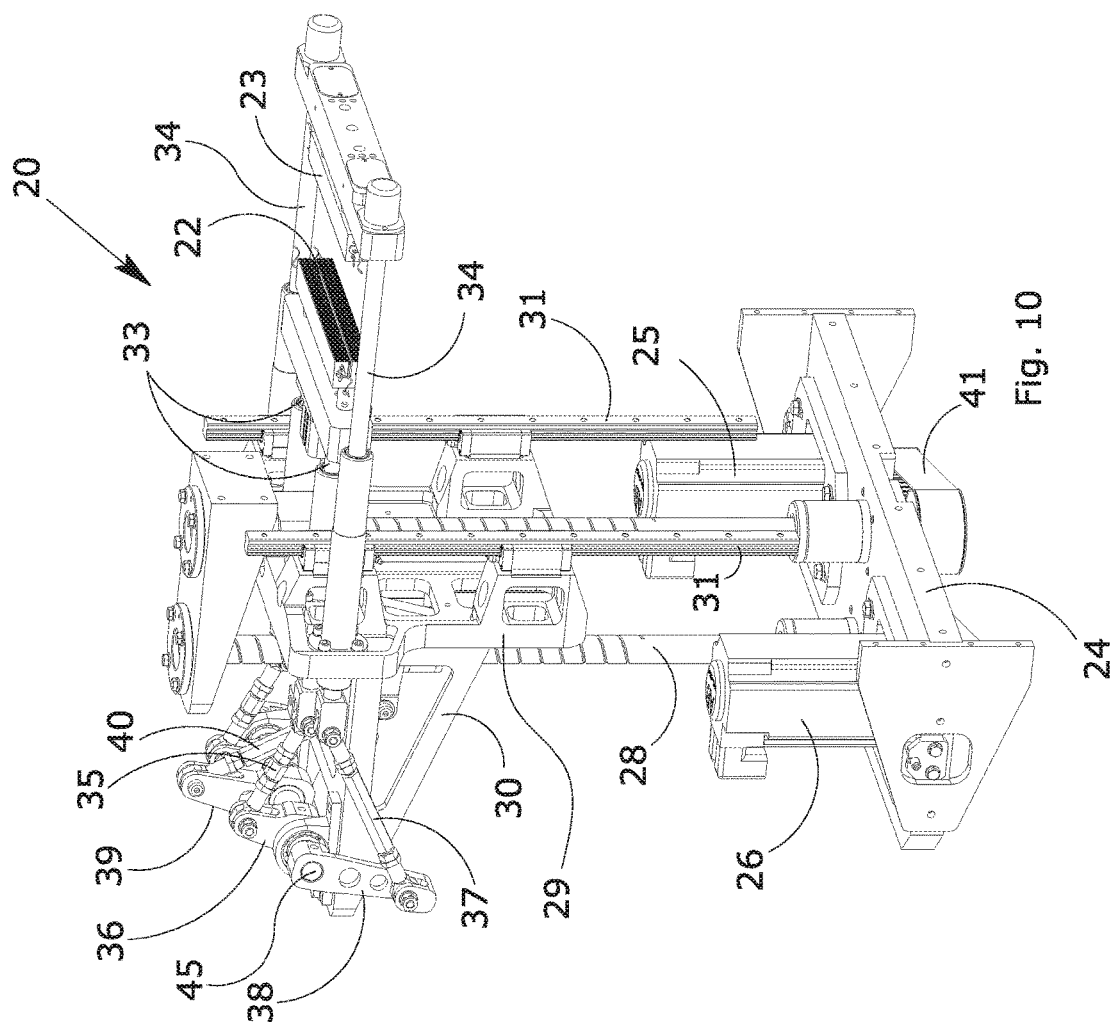

With reference to the accompanying figures, and initially to FIGS. 9 and 10, the packaging machine according to the invention comprises a transversal sealing unit indicated overall with reference number 20, substantially consisting of a plate support 21 which comprises a series of additional supports and kinematic organs for the activation of grippers 22 and 23, one internal and the other external, for the sealing and cutting of each bag which is formed by the same packaging machine.

With reference first of all to FIG. 9, the plate indicated with number 21 in turn comprises a motor support 24 consisting of a horizontal plate on which two motors 25 and 26 are fixed.

The motor support 24 is also fitted with two parallel vertical shafts 27 and 28, or screws, since they are screw threaded, which are kinematically connected to a main carriage 29 and to a gripper carriage 30.

The main carriage 29 consists of a plate sliding on vertical guides 31, while the gripper carriage 30 slides on a central vertical guide 32 positioned on the main carriage 29.

The main carriage 29 is vertically moved by means of the scroll 43 (see FIG. 8) of the screw 27 activated by the motor 25, while the gripper carriage 30 is vertically moved by means of the scroll 44 (see FIG. 8) of the screw 28 activated by the motor 26.

From the opposite side of the plate with respect to the organs described above, as can be seen in FIG. 10, two pairs of horizontal parallel arms 33, 34 protrude, sliding in respective sleeves, the internal first arms controlling the horizontal movement of the internal grippers 22 and the second arms controlling the horizontal movement of the external grippers 23, so that the grippers can carry out the following movements:

gripper opening;
vertical following of the bag being formed;
gripper closing;
sealing;
cutting of the bag;
opening and rising.
considering that the vertical movements of the gripper unit are obtained by the movement of the main carriage 29.

The two pairs of horizontal sliding parallel arms 33 and 34, the internal first of which control the horizontal movement of the internal grippers 22 and the second control the horizontal movement of the external grippers 23, are kinematically connected to a plurality of levers and tie rods, positioned on the horizontal support of the carriage 29, which will now be described in detail.

As can be seen in FIG. 10, the internal horizontal arms 33 are activated by a crank mechanism consisting of pairs of tie rods 35 activated by respective pairs of levers 36, while the external horizontal arms 34 are activated by pairs of tie rods 37 activated by respective pairs of levers 38.

The gripper activation unit is equipped at its centre with a lever 39 activated by a tie rod 40, the other end of which is hinged to the gripper carriage 30, which, as stated above, is vertically activated by the screw 28 activated by the motor 26.

As can be seen in FIG. 7, the pulleys of the two motors 25 and 26 are kinematically connected to the pulleys of the screws 27 and 28 by means of drive belts 41 and 42.

As already stated, the main feature of the invention consisting of this sealing unit is the positioning of the motors 25 and 26 in a fixed zone; therefore the motors do not move, avoiding the problems described above.

The opening-closing of the grippers 22 and 23 takes place by setting different speeds for the two screws 27 and 28 activated by the motors 25 and 26.

The functioning of the bag forming with "Box-Motion" type machines is defined as continuous since the film is fed in a continuous operation. The film speed may change but it never stops during functioning.

The sealing grippers 22 and 23 must follow the bag during its movement; in particular, during sealing the closed grippers must move at the same speed as the bag.

The main movements of the grippers are entrusted to the vertical movement of the main carriage 29 and the gripper carriage 30, achieved by means of two scrolls activated by the screws 27 and 28 in turn rotated by means of the two motors 25 and 26.

If the two screws 27 and 28 rotate at the same speed, the carriage moves vertically and the grippers remain as they are, at the same distance from each other. If they are open, they remain open; if they are closed, they remain closed.

The vertical movement of the entire unit, mounted on the carriage 29, is entrusted to the movement of the scroll 43, caused by the rotation of the screw 27.

The opening-closing of the grippers takes place by setting different speeds for the two screws 27 and 28.

For example, if the screw 28 rotates more quickly than the screw 27, the scroll 44, by means of the tie rod 40 and the lever 39, rotates the shaft 45 which turns the levers 36 and 38 in an anticlockwise direction; the levers 38, by means of the tie rods 37, activate the external grippers 23 moving them closer to the front plate 21; in the same way, following the clockwise rotation of the lever 36, the internal grippers 22 move away from the front plate 21.

The consequence of these movements is the closure of the grippers 22 and 23 and the movement of the carriage 29 controlled by the speed of the scroll 43.

By combining the rotation speeds of the screws 27 and 28, it is possible to obtain opening and closing movements of the grippers 22 and 23 and rising and descending movements of the main carriage 29 which causes the vertical movement of the grippers.

The invention is described above with reference to a preferred embodiment. It is nevertheless clear that the invention is susceptible to numerous variations which lie within the scope of its disclosure, in the framework of technical equivalents.

The invention claimed is:

1. A packaging machine comprising:
   a transversal sealing unit of bags comprising:
   a plate support which comprises a series of additional supports and kinematic organs for horizontal and vertical activation of grippers, wherein one of the grippers is internal and another of the grippers is external, for the sealing and cutting of each bag, and
   a first and a second motor, respectively mounted on a fixed support, which cause vertical movement of a main carriage and of a gripper carriage, said main carriage supporting two pairs of horizontal and sliding parallel arms that control horizontal movement of the internal gripper and horizontal movement of the external gripper, wherein vertical movement of the grippers to follow movement of a bag is achieved by vertical movement of the main carriage, wherein the main carriage comprises a plate sliding on vertical guides, wherein the gripper carriage slides on a central vertical guide positioned on the main carriage, said main carriage being vertically movable by a screw activated by the first motor, wherein the gripper carriage is vertically moved by a screw activated by the second motor, wherein the plate support comprises a motor support comprising a horizontal plate on which said first and second motors are fixed, and wherein the motor support is also fitted to the two screws, which are kinematically connected to the main carriage and to the gripper carriage.

2. The machine of claim 1, wherein from the opposite side of the support plate two pairs of horizontal sliding parallel arms protrude, the internal first of which controls the horizontal movement of the internal gripper and the second of which controls the horizontal movement of the external gripper, so that the grippers can carry out the following movements:

gripper opening;
vertical following of the bag as the bag is being formed;
gripper closing;
sealing;
cutting of the bag;
opening and rising.

3. The machine of claim 2, wherein the two pairs of horizontal sliding parallel arms are kinematically connected to a plurality of levers and tie rods, positioned on the horizontal support of the carriage, and positioned on the horizontal shaft.

4. The machine of claim 3, wherein the internal horizontal arms are activated by a crank mechanism consisting of pairs of tie rods activated by respective pairs of levers, wherein the external horizontal arms are activated by pairs of tie rods activated by respective pairs of levers, the gripper activation unit being equipped at its center with a lever activated by a tie rod, which is hinged to the gripper carriage and is vertically activated by the screw activated by the second motor, the pulleys of the first and second motors being connected kinematically to pulleys of the screws by drive belts.

5. The machine of claim 4, wherein the opening-closing of the grippers takes place by setting different speeds for the screws activated by the first and second motors.

6. The machine of claim 1, wherein movements of the grippers are achieved by means of two scrolls activated by the two screws in turn rotated by means of the first and second motors.

7. The machine of claim 6, whereby when the two screws rotate at the same speed the main carriage moves vertically and the grippers remain at the same distance from each other, namely if the grippers are open the grippers remain open, and if the grippers are closed the grippers remain closed.

8. The machine of claim 7, wherein the opening and closing of the grippers takes place by setting different rotation speeds for the two screws, whereby, by combining the rotation speeds of the screws it is possible to obtain opening and closing movements of the grippers and rising and descending movements of the main carriage, which causes vertical movement of the grippers.

* * * * *